Sept. 6, 1960 L. P. MORGAN 2,951,951
ELECTRIC GATING AND THE LIKE
Filed Oct. 23, 1956
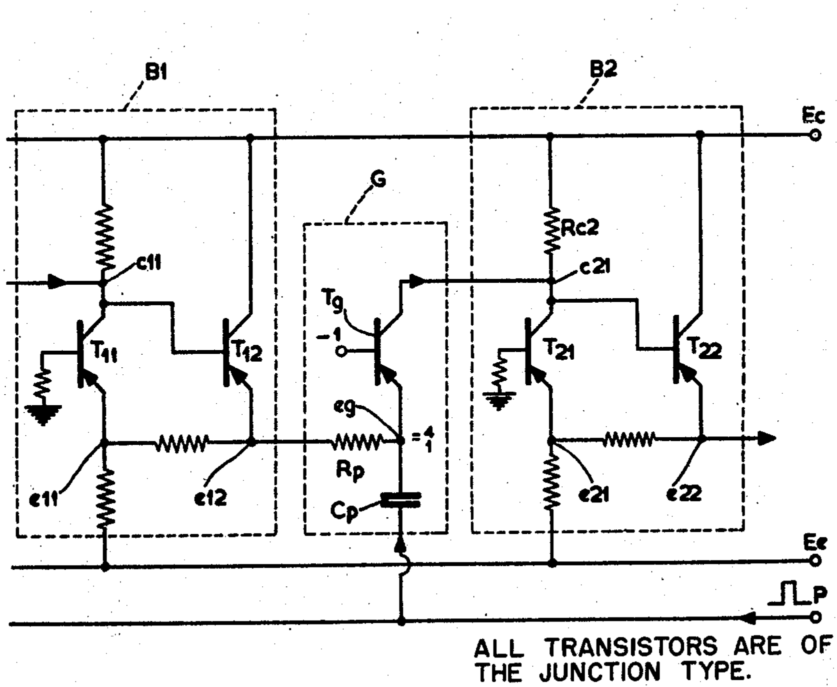
ALL TRANSISTORS ARE OF THE JUNCTION TYPE.
INVENTOR
LEONARD PETER MORGAN
BY
AGENT United States Patent Office 2,951,951

Patented Sept. 6, 1960

2,951,951

ELECTRIC GATING AND THE LIKE

Leonard Peter Morgan, Purley, England, assignor, by mesne assignments, to North American Philips Company, Inc., New York, N.Y., a corporation of Delaware Filed Oct. 23, 1956, Ser. No. 617,885

Claims priority, application Great Britain Oct. 31, 1955

4 Claims. (Cl. 307—88.5)

This invention relates to electric gating and like circuits. In many circuit applications it is necessary to provide gate circuits for the selective passing of individual electric pulses depending upon predetermined conditions. Typical examples are digital ring counters, and counting circuit arrangements of the kind comprising a chain of bistable or monostable units adapted to be triggered progressively to register a count.

Such types of circuit arrangement may employ transistor trigger circuits as described in co-pending application Serial #562,529. Such a trigger circuit comprises a first transistor having an emitter-to-collector current gain less than unity with an impedance in its emitter circuit and an impedance in its collector circuit which impedance provide D.C. paths, a second transistor of the same conductivity type also having an emitter-to-collector current gain less than unity, and a regenerative feedback loop including a coupling providing a D.C. path between the collector of said first transistor and the base of said second transistor and a coupling comprising an impedance between the emitters of the two transistors.

As is explained in said co-pending application Serial #562,529, it is possible to reduce the hole storage effects which occur when a transistor, in this case the first transistor, is current saturated or bottomed. For this purpose the collector of said transistor may be connected through a rectifier to a source of potential intermediate between its collector voltage and ground. The rectifier becomes conductive before the transistor becomes current-saturated or bottomed and it thus constitutes effectively a low resistance across the load in the collector circuit of the first transistor.

A plurality of such trigger circuits having an On state and an Off state may be connected in succession as the units or stages of a counting or like circuit. In such case each unit may be coupled to the succeeding unit through a rectifier receiving a steering voltage from the first unit; in particular, the coupling may be arranged in such manner that when the first stage is in the Off state, it causes biassing of the corresponding rectifier in its reverse direction sufficiently to prevent input pulses applied to the rectifier from reaching the succeeding transistor stage, while in the On state increased collector current reduces said biassing of the rectifier sufficiently to permit a pulse to pass the rectifier and trigger the succeeding transistor stage from its Off state to its On state.

It is an object of the present invention to provide an improved gating circuit capable inter alia of replacing both the rectifiers mentioned above while at the same time providing improved performance.

According to the present invention a gate circuit for transferring information in digital form from a first transistor trigger circuit to a second transistor trigger circuit comprises a gating transistor having its base held at a substantially constant potential, its collector connected to a trigger input point of said second trigger circuit, and its emitter coupled to a pulse input point provided for connection to a source of pulses all having the same sense, such sense being appropriate for triggering said second trigger circuit via the emitter-collector path of said gating transistor, and means comprising a time delay circuit for applying to said emitter a steering voltage dependent upon the state of the first trigger circuit and such as to allow the second trigger circuit to be triggered by one of said pulses to the same state as the first trigger circuit.

A preferred embodiment of the invention will now be described with reference to the accompanying diagrammatic drawing as applied to the coupling between two successive bistable stages or units forming part of a chain of four bistable units preceded by a single binary stage (not shown) in a decade counter.

In this example the bistable units are as described in the aforesaid patent specification.

The general operation of the counter is, briefly, as follows: The first input pulse switches the binary stage. The second pulse causes the binary stage to revert to its original condition, but a triggering pulse is obtained which switches on the first bistable stage. In addition, the gate to the next bistable stage is opened, so that it can be switched on by a subsequent pulse from the binary stage. The third input pulse switches the binary stage, but the bistable stages are not affected. The fourth input pulse switches off the binary stage, but switches on the second bistable stage, and so forth. The process continues until the tenth pulse, when a pulse from the fourth bistable stage resets all stages to zero. At the same time, an output pulse is passed e.g. to storage or indicating means, or to a further decade counter.

In the drawing, only two of the four bistable units or stages are shown, these being referred to as B1 and B2 and comprising PNP junction transistors T11—T12 and T21—T22 respectively. A gate circuit G in accordance with the invention is connected between units B1 and B2 and is supplied with positive pulses from a common pulse input point P which is also connected to the other similar gates of the chain.

Although the circuits of units B1 and B2 have been shown, a detailed description of their operation is not given since a full description is available in the aforesaid patent specification. However, it will be recalled that in each case the first transistor (T11 or T21) conducts in the condition referred to as the "On" condition and becomes substantially non-conductive in the "Off" condition.

In view of the aforesaid operation of the decade as a whole, the gate must stop a pulse when the preceding circuit is Off and pass a pulse when the preceding circuit is On.

A delay must be incorporated so that if the first bistable circuit B1 is switched on, the gate will not allow the pulse which switched the first circuit to switch the second; e.g. for 50 kc./s. working this requires a delay of about 10 μs.

The gate circuit G comprises a gating transistor Tg having an emitter $e_g$ connected to the pulse input point P through a capacitance Cp and also the steering point e12 of unit B1 through a resistance Rp.

In the circuit shown, the voltages used may for example, and for convenience of description, be given as follows:

| | Volts |
|---|---|
| Ec | 4 |
| Potential applied to base of transistor Tg | —1 |
| Ee | +2 |

The operation with these voltages is as follows:

Point e12 is substantially at −4 volts when unit B1 is in the Off condition, and the same point is at −1 volt when the unit B1 is On. Therefore, when unit B1 is Off, point $e_g$ is at −4 volts and therefore transistor Tg is cut off and a positive pulse at point $e_g$ will have no effect. On the other hand, when unit B1 is On, point $e_g$ is at −1 volt; therefore transistor T*g* is only just cut off or slightly conducting and a positive pulse at point $e_g$ will cause transistor T*g* to conduct so as to draw sufficient trigger current through the collector load R*c*2 to switch unit B2 to the On condition. When unit B2 is switched On, point C21 goes positive and its potential is caught at −1 volt by the collector diode of transistor T*g* becoming conductive.

The time constant of elements R*p*—C*p* gives the delay necessary to prevent unwanted triggering, and the values used may for example be 2.2KΩ and 0.003 μf. respectively at the working speed referred to previously (50 kc./s.).

The point *e*12 offers a low impedance to the pulses from point P so that a positive trigger pulse at point $e_g$ will not affect the unit B1.

By switching the unit B2 through the collector of transistor T*g*, a diode such as would normally be connected between point *e*21 and ground (to stabilise the trigger sensitivity) can be dispensed with.

Among the advantages of the circuit described are the following:

(1) The circuit is simple and employs a relatively small number of components; in particular, one transistor is used in place of two diodes.

(2) The circuit is relatively insensitive to variations of pulse amplitude; thus, with the values given, such amplitude can vary as much as between 0.75 volt and 2.0 volts.

(3) The delay system R*p*—C*p* can work effectively while allowing relatively high operating change-over speeds, which speeds can quite conveniently be raised to about 50 kc.

(4) The bistable units need not be designed to such close tolerance as is necessary when triggering is effected at the base of the first transistor of each unit.

As an alternative to bistable units according to the aforesaid patent specification, units according to copending application Serial #562,529 may be used. Moreover, two units with one gate as shown in the drawing may be used for some purposes without the other units or stages required for a decade or like chain.

It is to be understood, of course, that the quantitative data given above is given to enable ready practice of the invention and is not intended in any way to limit its scope, which scope is set forth in the following claims.

What I claim is:

1. A gate circuit for transferring information in digital form from a first transistor trigger circuit to a second transistor trigger circuit, said gate circuit comprising a gating transistor having its base held at a substantially constant potential, its collector connected to a trigger input point of said second trigger circuit, and its emitter coupled to a pulse input point which is connected to a source of pulses all having the same sense, said sense being such that the second trigger circuit is triggered via the emitter-collector path of said gating transistor, and means comprising a time delay circuit for applying to said emitter a steering voltage from a steering point of the first trigger circuit dependent upon the state of the first trigger circuit and such as to allow the second trigger circuit to be triggered by one of said pulses to the same state as the first trigger circuit, each trigger comprising a pair of junction transistors asymmetrically arranged with the collector of the first transistor directly connected to the base of the second transistor, each steering point being constituted by the emitter of the second transistor of the respective trigger circuit.

2. A gate circuit for transferring information in digital form from a first transistor trigger circuit to a second transistor trigger circuit, said gate circuit comprising a gating transistor having its base held at a substantially constant potential, its collector connected to a trigger input point of said second trigger circuit, and its emitter coupled to a pulse input point which is connected to a source of pulses all having the same sense, said sense being such that the second trigger circuit is triggered via the emitter-collector path of said gating transistor, and means comprising a time delay circuit for applying to said emitter a steering voltage from a steering point of the first trigger circuit dependent upon the state of the first trigger circuit and such as to allow the second trigger circuit to be triggered by one of said pulses to the same state as the first trigger circuit, each trigger comprsing a pair of junction transistors asymmetrically arranged with the collector of the first transistor directly connected to the base of the second transistor, each steering point being constituted by the emitter of the second transistor of the respective trigger circuit, said time delay circuit comprising a capacitance through which the emitter of the gating transistor is coupled to said source of pulses and a resistance through which said emitter is connected to the steering point of the first trigger circuit for the supply of steering voltage.

3. A circuit arrangement as set forth in claim 1, wherein the collector of the gating transistor is connected to the collector of the first transistor of the second trigger circuit.

4. A circuit arrangement as set forth in claim 2, wherein the collector of the gating transistor is connected to the collector of the first transistor of the second trigger circuit.

References Cited in the file of this patent

UNITED STATES PATENTS

| | | |
|---|---|---|
| 2,551,119 | Haddad | May 1, 1951 |
| 2,627,039 | Williams | Jan. 27, 1953 |
| 2,629,834 | Trent | Feb. 24, 1953 |
| 2,831,127 | Braicks | Apr. 15, 1958 |

OTHER REFERENCES

"The Transistor" (book), page 624, prepared by Bell Telephone Laboratories.

"High Speed Recording Control Circuit"; Third Interim Progress Report by Institute of Advanced Study, Princeton Univ., January 1948, pp. 127 and 129 and 138.

Article, entitled "An Electronic Digital Computer," by Booth, Electronic Engineering, December 1950, pp. 492–498.